US006125733A

United States Patent [19]

Hwang

[11] Patent Number: 6,125,733

[45] Date of Patent: Oct. 3, 2000

[54] FOAM SPONGE CUTTING MACHINE WITH VERTICAL BLADE STRAP

[76] Inventor: Ber-Fong Hwang, 1F, No. 1, Lane 30, Sec. 1, Yan-Chi St., Taipei, Taiwan

[21] Appl. No.: 09/229,573

[22] Filed: Jan. 13, 1999

[51] Int. Cl.7 .............................. B26D 1/48; B23D 53/04

[52] U.S. Cl. .............................. 83/820; 83/651.1; 83/788; 83/789; 83/809

[58] Field of Search .............................. 83/789, 788, 801, 83/809, 820, 651.1

[56] References Cited

U.S. PATENT DOCUMENTS

| | | | |
|---|---|---|---|
| 2,524,016 | 9/1950 | Hall | 83/820 |
| 3,350,970 | 11/1967 | Glastra | 83/820 |
| 3,669,163 | 6/1972 | Crane | 83/788 |
| 3,800,650 | 4/1974 | Schroder | 83/789 |
| 3,850,061 | 11/1974 | Wirstrom | 83/820 |
| 4,179,966 | 12/1979 | Ginnow et al. | 83/820 |
| 4,606,254 | 8/1986 | Schmalz | 83/820 |
| 4,683,791 | 8/1987 | Demont | 83/651.1 |
| 4,915,000 | 4/1990 | MacFarlane | 83/820 |
| 5,191,824 | 3/1993 | Rathbun, Jr. | 83/651.1 |
| 5,213,022 | 5/1993 | Elgan | 83/801 |

*Primary Examiner*—M. Rachuba
*Assistant Examiner*—Sean Pryor
*Attorney, Agent, or Firm*—Dougherty & Troxell

[57] ABSTRACT

A foam sponge cutting machine with vertical blade strap, including a blade strap rack, a machine body and a blade rotating set. The blade rotating set is disposed on the guide rails of the upper and lower transverse beams of the blade strap rack, whereby the blade strap clamped by the blade rotating set can be kept vertical and moved left and right. The machine body is disposed with a working bench for linearly back and forth moving a work piece placed thereon. By means of numeral controlling method, the positions of the work piece and the blade strap on a plane can be adjusted so as to cut the foam sponge by various irregular or curved lines.

6 Claims, 7 Drawing Sheets

FOAM SPONGE CUTTING MACHINE WITH VERTICAL BLADE STRAP

BACKGROUND OF THE INVENTION

The present invention relates to a foam sponge cutting machine with vertical blade strap, and more particularly to a foam sponge cutting machine in which the vertical blade strap can be moved left and right to cut the foam sponge by various irregular or curved lines.

It is known that a foam sponge blank material has a considerably large volume. The foam sponge is cut into a shape as necessary generally by a cutting machine. The cutting machine is equipped with a working bench which is reciprocally movable. A blade is partially exposed outside a blade rack and is driven to continuously revolve. The foam sponge is placed on the working bench. When moved to pass through the blade, the foam sponge is cut.

In the conventional foam sponge cutting machine, the blade is not movable, so that the foam sponge can be only linearly cut. In addition, the conventional cutting machine lacks blade deflection rectifying structure and the blade cannot be rectified in time. As a result, it often takes place that the foam sponge is cut with an unplane cutting face. Moreover, after the blade is worn and becomes dull, it is difficult to replace the blade with a new one.

SUMMARY OF THE INVENTION

It is a primary object of the present invention to provide a foam sponge cutting machine with vertical blade strap, in which the blade strap is left and right movable and the working bench is linearly reciprocally movable for back and forth moving a work piece placed thereon so as to planely cut the foam sponge by various irregular or curved lines. A blade strap deflection rectifying mechanism is added to the cutting machine for stabilizing the cutting of the blade strap.

It is a further object of the present invention to provide the above foam sponge cutting machine in which a blade sharpening mechanism is added, whereby the dull blade strap can be directly sharpened on the cutting machine without being taken down.

According to the above objects, the foam sponge cutting machine of the present invention includes a machine body, a blade strap rack, a blade rotating set, a guide wheel set and a blade sharpening mechanism. A working bench is disposed on the surface of the machine body for linearly back and forth moving a work piece placed thereon. The blade strap rack is a frame body surrounding the machine body. The blade strap rack has an upper transverse beam and a lower transverse beam each of which is disposed with guide rail and transmission mechanism. The blade rotating set includes an upper and a lower blade seats hung on the guide rails of the upper and lower transverse beams of the blade strap rack and coupled with the transmission mechanisms. The blade strap deflection rectifying mechanism is disposed at the blade seat. The guide wheel set includes a driving wheel, several guide wheels and two pulleys respectively disposed on two blade seats. The blade sharpening mechanism is disposed on the machine body, including a left and a right blade grinding sets, a locating member and a transmission mechanism.

The blade strap is such pulled and conducted as to be partially vertically exposed between the blade rotating set with a fixed total length. The blade strap is movable along with the blade rotating set. By means of numeral controlling method, in cooperation with the back and forth moved work piece, the positions of the work piece and the blade strap can be adjusted so as to cut the foam sponge by various irregular or curved lines. By means of the blade strap deflection rectifying mechanism, the cutting can be performed more stably.

The present invention can be best understood through the following description and accompanying drawings, wherein:

DETAILED DESCRIPTION OF THE PREFERRED EMBODIMENT

Figure 1:
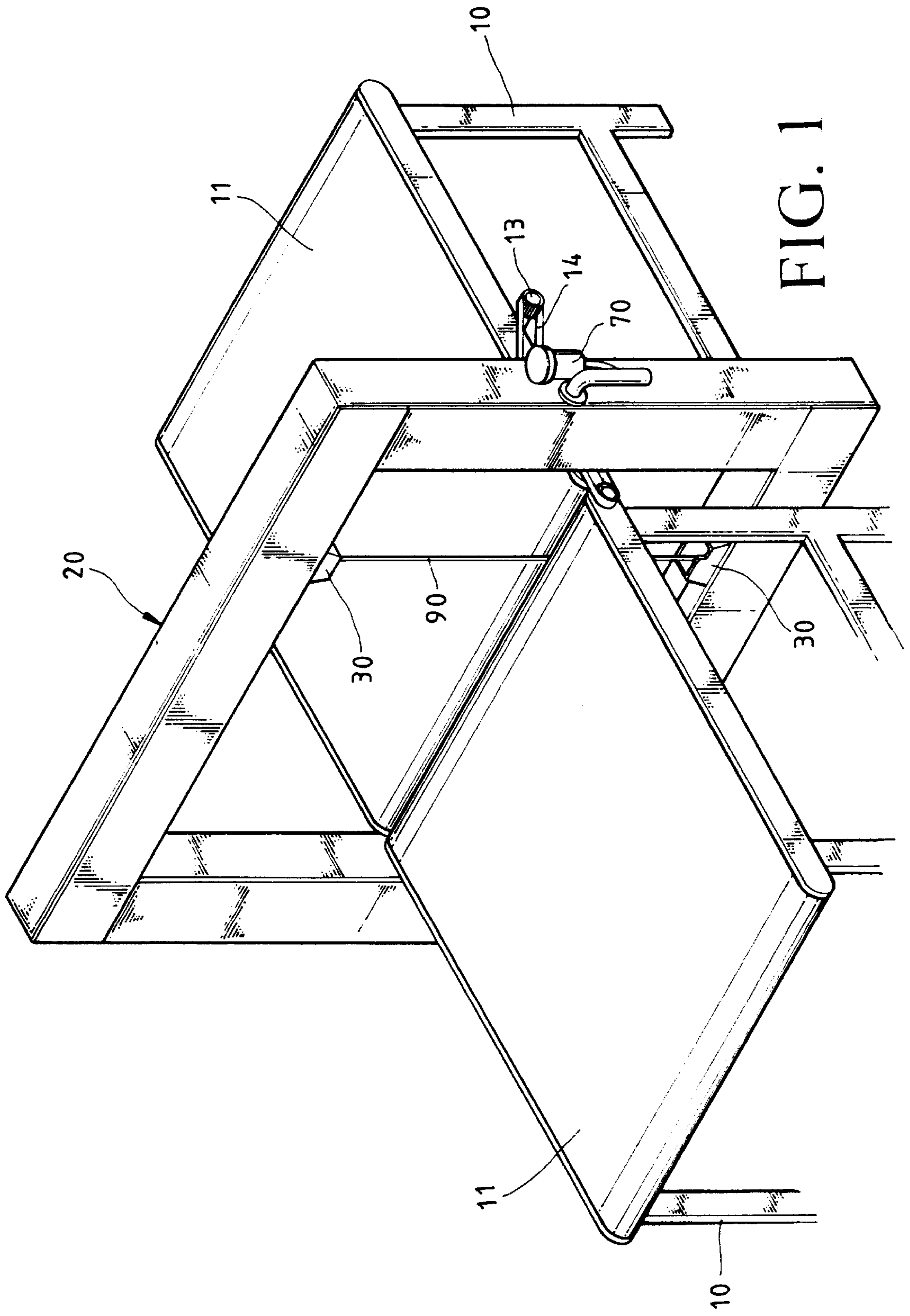
FIG. 1 is a perspective view of the present invention.
Figure 2:
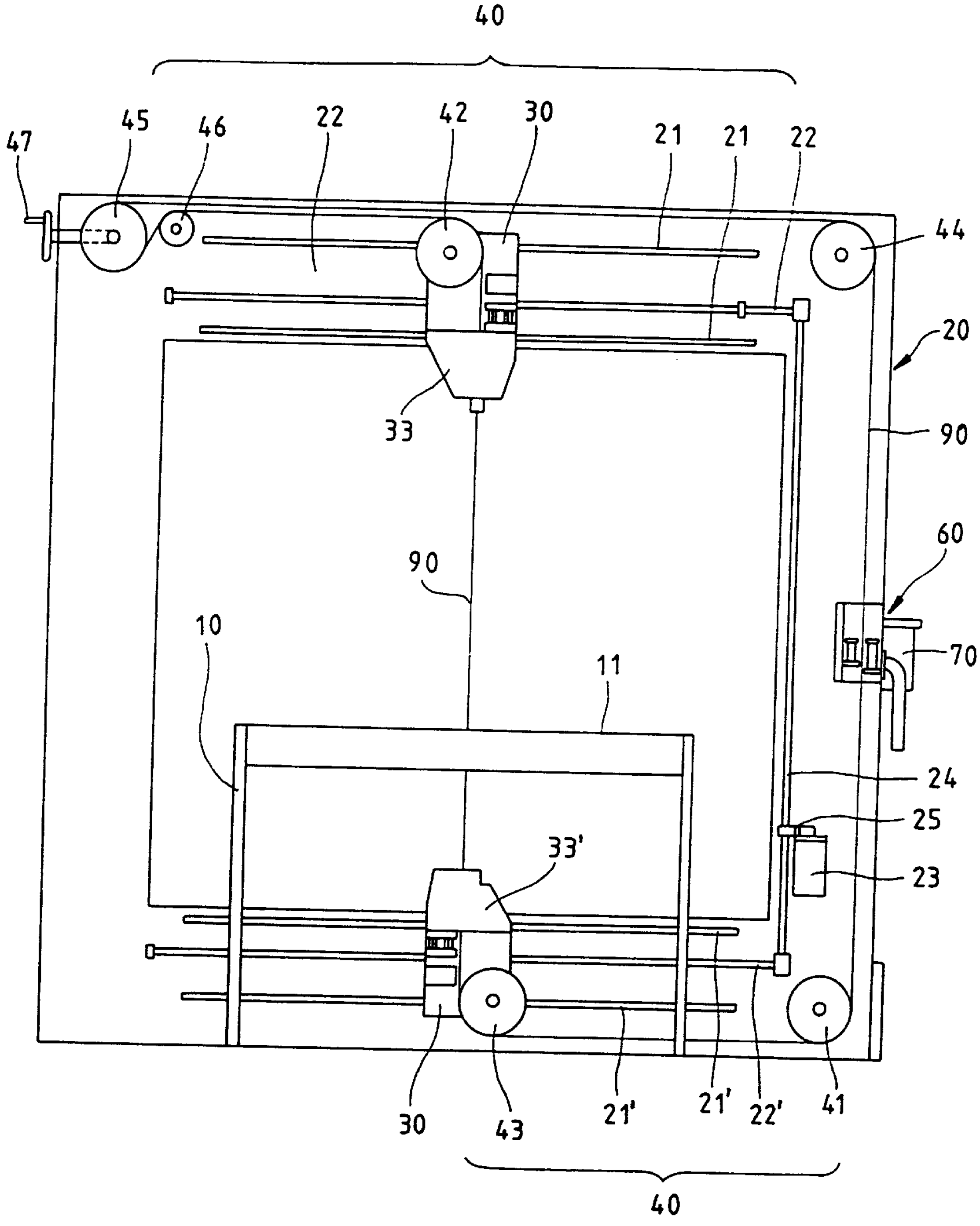
FIG. 2 is a front view of the present invention with the outer cover of the blade strap rack removed.

Please refer to FIGS. 1 and 2. The cutting machine of the present invention includes a machine body 10, a blade strap rack 20 and a blade rotating set 30. The machine body 10 is disposed with a working bench 11. The blade strap rack 20 has an upper and a lower transverse beams each disposed with a guide rail 21 21' and a spiral rod 22 22'. An exhaustion mechanism 70 is mounted beside an upright column of the blade strap rack 20. The blade rotating set 30 includes an upper and a lower blade seats respectively hung on the upper and lower guide rails 21 of the blade strap rack 20 and coupled with the spiral rods 22. The cutting machine further includes a guide wheel set 40 including a driving wheel 41, an upper and a lower pulleys 42, 43 and three guide wheels 44, 45, 46. The driving wheel 41 is mounted on the lower beam of the blade strap rack 20 and connected with one end of an output shaft of a motor. The upper and lower pulleys 42, 43 are respectively disposed on the upper and lower blade seats of the blade rotating set 30. The first and second guide wheels 44, 45 are respectively disposed at two ends of the upper beam. The upper rims of the first and second guide wheels 44, 45 are nearly tangential to each other. The third guide wheel 46 has smaller diameter and is disposed beside the second guide wheel 45. A rotary handle 47 is mounted on outer side of the second guide wheel 45 for adjusting the horizontal displacement of the second guide wheel 45 so as to tension the blade strap 90. A blade sharpening mechanism 60 is disposed in the upright column and communicated with the exhaustion mechanism 70.

A blade strap 90 is wound over the driving wheel 41 and then upward pulled to the first guide wheel 44 and then tangentially pulled to the second guide wheel 45 and then pulled to the third guide wheel 46. Then the blade strap 90 is pulled to the upper pulley 42 and then downward pulled to the lower pulley 43 and finally pulled back to the driving wheel 41 to define a cycling space. When the motor drives the driving wheel 41 to rotate, the blade strap 90 via the transmission of the guide wheel set 40 is continuously revolved so as to provide a cutting effect for the foam sponge on the working bench 11. The shifting of the blade rotating set 30 is controlled by a controlling mechanism. A transmission shaft 24 is coupled with the output shaft of the motor 23 via a belt and wheel set 25. An upper and a lower ends of the transmission shaft 24 are respectively perpendicularly connected with the spiral rods 22. When the motor 23 is rotated, the belt and wheel set 25 drive the transmission shaft 24 to rotate so as to drive both the upper and lower spiral rods 22 22'. At this time, the upper and lower blade seats 33 33' of the blade rotating set 30 synchronously move along the guide rails 21 21' and the upper and lower pulleys 42, 43 are moved along therewith. As a result, the blade strap 90 wound on the rims of the pulleys is moved. The blade rotating set 30 is synchronously moved so that the blade strap 90 is prevented from being torn apart and the exposed part of the blade strap 90 is kept vertical.

Figure 3:
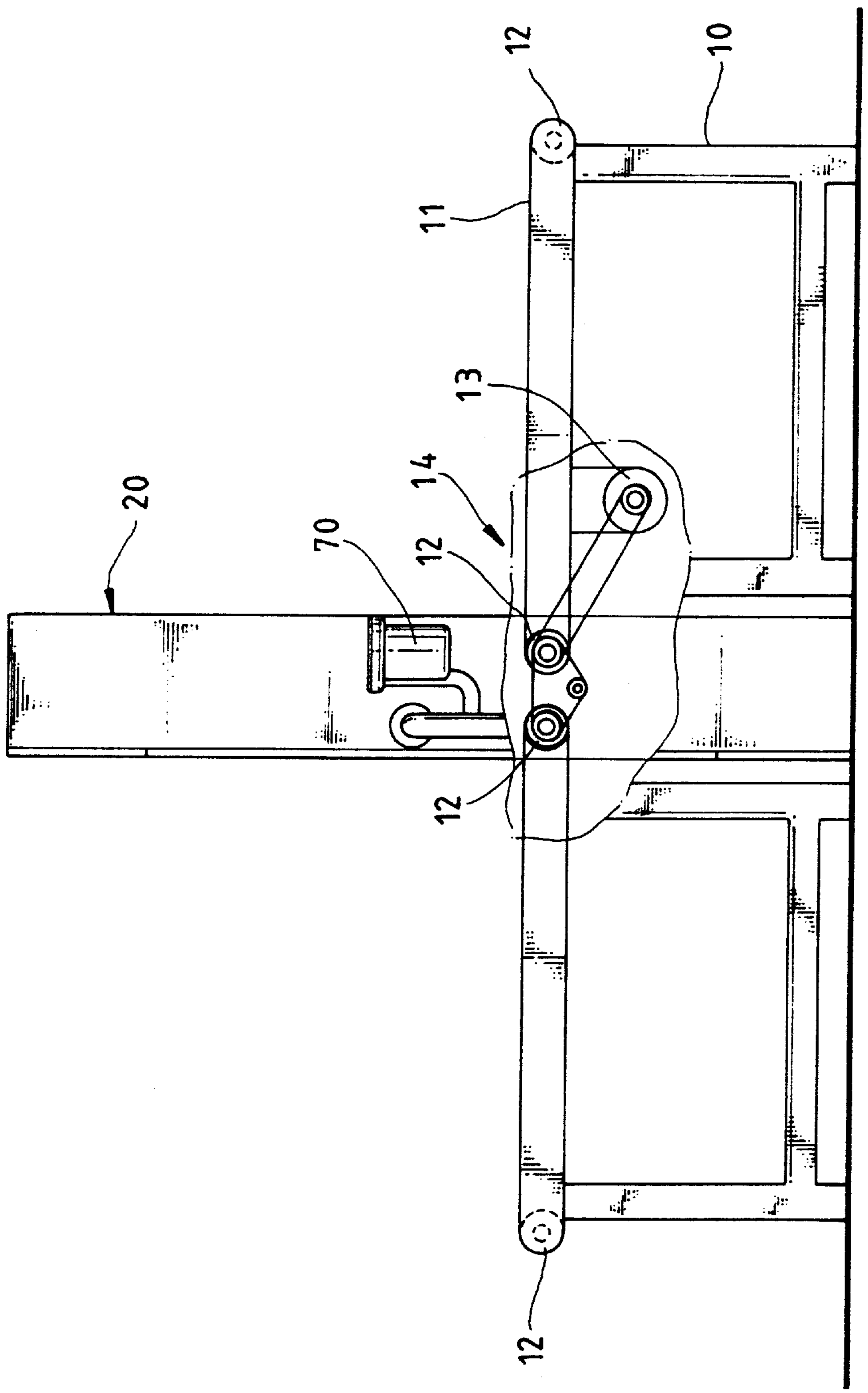
FIG. 3 is a side view of the working bench of the present invention.

Please refer to FIG. 3. The working bench 11 is formed by a motor 13 and several rollers 12 rotarily driven by the motor 13 via a belt and wheel set 14, serving as a conveying belt. The forward and backward rotational directions of the motor 13 are such controlled as to linearly back and forth move a work piece placed on the working bench 11.

Figure 7:
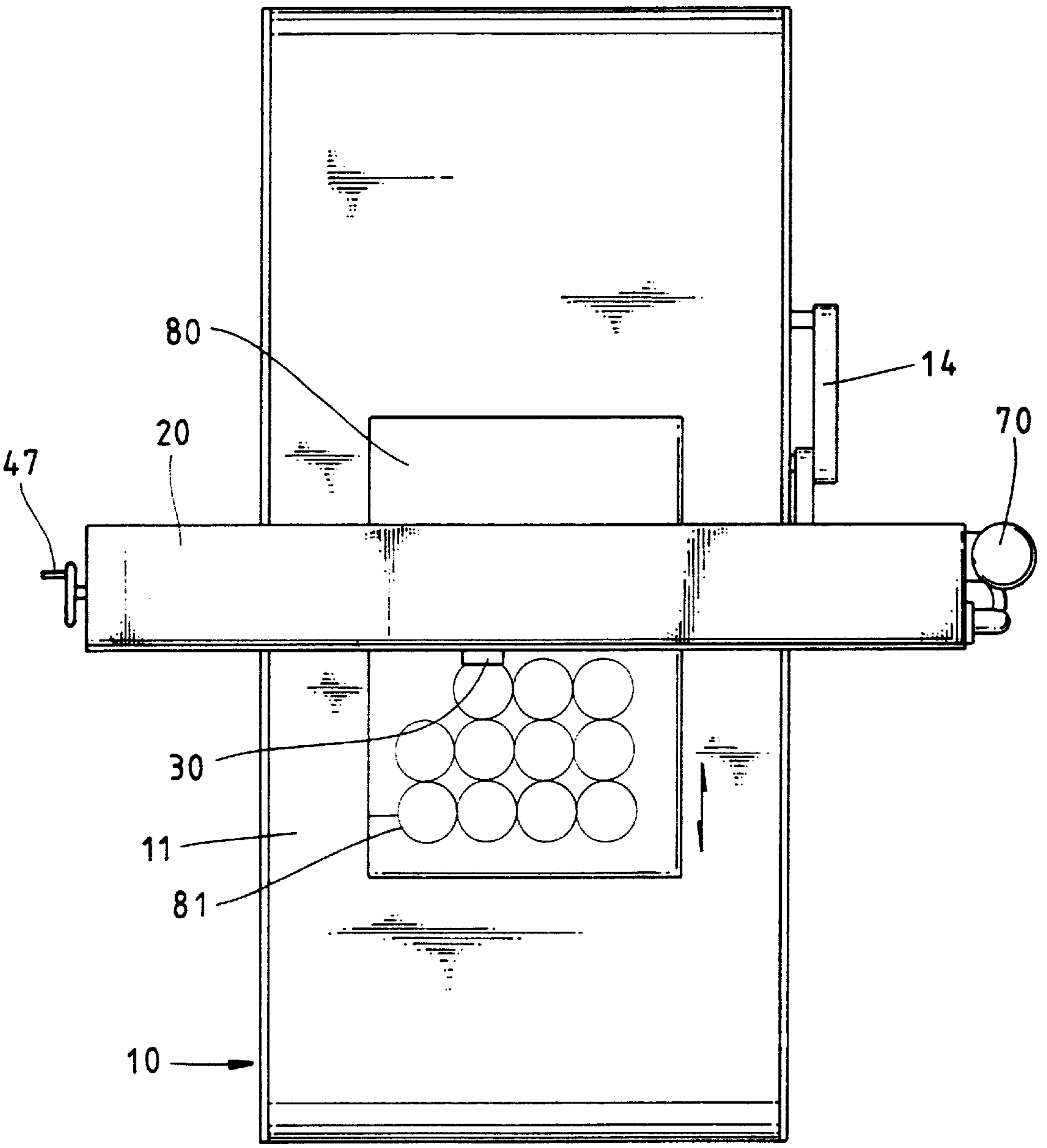
FIG. 7 is a top view of the present invention, showing the foam sponge cutting operation.

Referring to FIG. 7, a foam sponge block 80 is placed on the working bench 11 and is back and forth moved along with the working bench 11. The blade strap 90 can be moved left and right, so that by means of numeral controlling manner (not shown), the two dimensional positions of the foam sponge 80 and the blade strap 90 can be adjusted so as to cut the foam sponge by irregular or curved cutting line 81.

Figure 4:
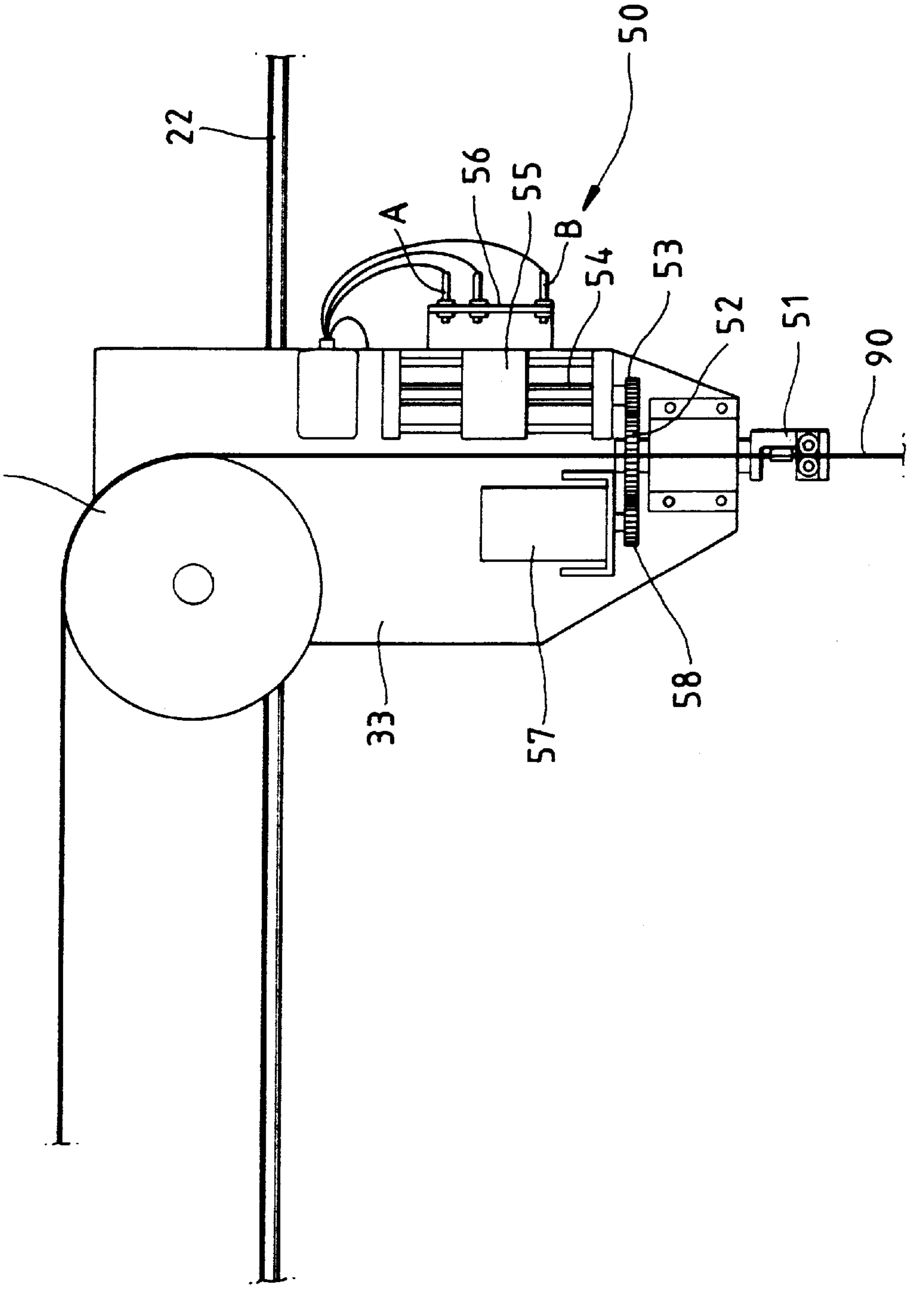
FIG. 4 is an assembled view of the blade strap deflection rectifying mechanism of the present invention.
Figure 5:
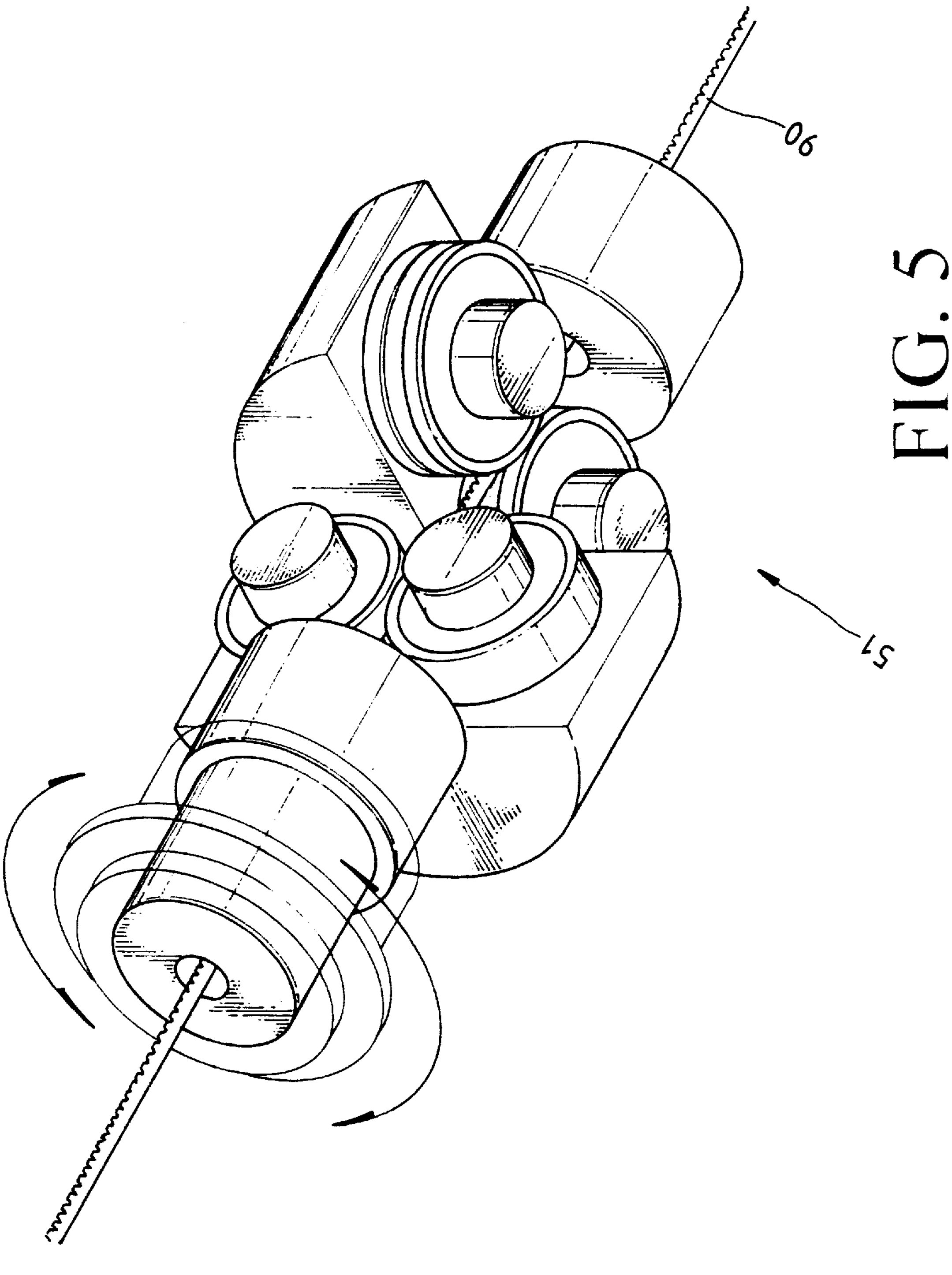
FIG. 5 is a perspective view of the blade strap deflection rectifying mechanism of the present invention.

Referring to FIGS. 4 and 5, in order to avoid excessively great deflection of the exposed cutting part of the blade strap 90 which may lead to unplane cutting face or breaking of the blade strap 90, a blade strap deflection rectifying mechanism 50 is disposed on the blade rotating set 30. A blade clamping seat 51 for clamping the blade strap 90 is combined with a first positive gear 52 two ends of which are respectively engaged with a second and a third positive gears 53, 58. The upper side of the second positive gear 53 is coupled with a spiral rod 54 on which a slide block 55 is disposed. A detector set 56 is disposed beside the slide block 55. The third positive gear 58 is disposed at one end of an output shaft of a servomotor 57.

When the blade face of the blade strap 90 is deflected through an angle, the blade clamping seat 51 is also rotated through an angle to make the first positive gear 52 rotate and indirectly drive the adjacent second positive gear 53 and spiral rod 54 to rotate. At this time, the slide block 55 is moved up and down. When the up and down displacement of the slide block responsive to the deflection angle of the blade strap 90 exceeds the allowed limit between the upper and lower sensors A, B, the detector set 56 will detect this and immediately activate the servomotor 57 to forward or backward rotate at proper time so as to drive the third positive gear 58 to rotate. At this time, the first positive gear 52 is driven to rotate and make blade clamping seat 51 carry the blade strap 90 to rectify the deflection into a correct angle. Therefore, the detector set serves as a safety device for automatically sensing and rectifying the deflection.

Figure 6:
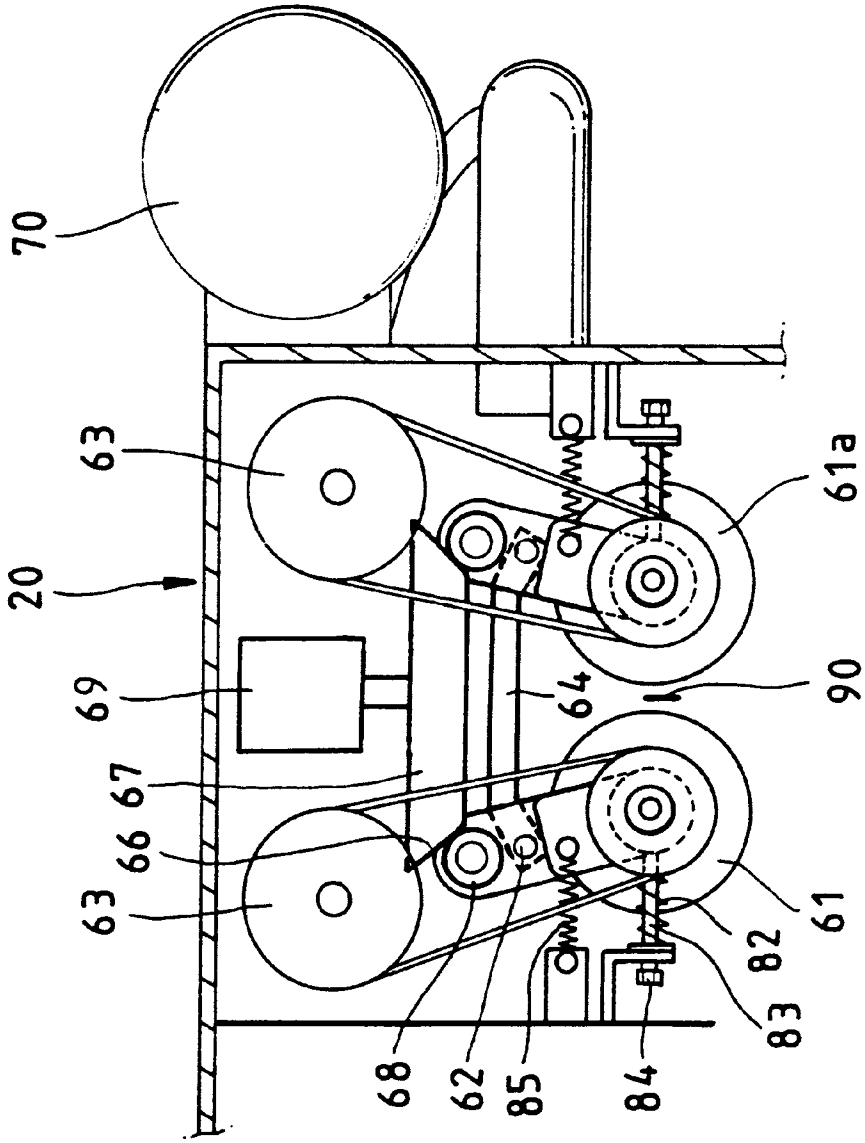
FIG. 6 shows the blade sharpening mechanism of the present invention.

As shown in FIGS. 2 and 6, a blade sharpening mechanism 60 is added to the cutting machine for directly sharpening the dull blade strap 90 on the cutting machine without taking down the blade strap 90 and then again mounting the blade strap 90 on the cutting machine as well as without obstacling the cutting operation. The blade sharpening mechanism 60 includes a grinding wheel set having a left and a right grinding wheels **61, 61*a*. Each grinding wheel via a belt is connected with a motor 63 and is driven thereby. A locating member 64 is bridged between the grinding wheels 61, 61*a* and pivotally connected therewith by pivot shafts 62. A rotary wheel 68 is disposed at a rear end of a connecting plate of each grinding wheel 61, 61*a*. A plate-like linkage 67 is disposed at a front end of a shaft of a pneumatic cylinder 69. Two sides of the linkage 67 are disposed with slope faces 66 respectively leant against the rotary wheels 68. When the pneumatic cylinder 69 extends out, the rotary wheels 68 are pressed by the slope faces to stretch outward. At this time, the grinding wheels 61, 61*a* with the pivot shafts 62 as the fulcrums are pivoted toward each other so as to grind two sides of the blade strap 90. Between the blade strap rack and the grinding wheel, a compression spring 82 is disposed on a distance measuring rod 83 connected with the grinding wheel. A tail end of the distance measuring rod 83 is locked with an adjusting nut 84 for controlling the gap between the grinding wheels and the blade strap 90. An extension spring 85 is disposed on one side of the pivot shaft 62 opposite to the rotary wheel 68. After the pneumatic cylinder 69 is retracted, the extension spring 85 pulls back the grinding wheels 61, 61*a* and restores the rotary wheels 68 to their home positions. A sucking tube 71 of the exhaustion mechanism 70 is extended into the blade grinding mechanism 60 for sucking and exhausting the iron chips produced in the grinding operation and preventing the iron chips from accumulating in the blade strap rack 20**.

When grinding the blade, the pneumatic cylinder 69 is activated to push the plate-like linkage 67. At this time, the slope faces on two sides of the linkage abut against the rotary wheels 68. Due to leverage, the two grinding wheels **61, 61*a* are moved in reverse directions toward the blade strap 90 to contact with the blade strap 90. At the same time, the motor 63 is activated to rotate the grinding wheels 61, 61*a* for grinding two sides of the blade strap 90**.

According to the above arrangements, the blade rotating set 30 and the blade strap rack 20 serve to move the blade strap 90 left and right. In cooperation with the working bench 11 which makes the work piece move back and forth, the foam sponge can be cut by irregular or curved line. The blade strap deflection rectifying mechanism 50 is able to make the cutting face plane. The additional blade sharpening mechanism 60 serves to grind and sharpen the blade strap.

It should be noted that the above description and accompanying drawings are only used to illustrate one embodiment of the present invention, not intended to limit the scope thereof. Any modification of the embodiment should fall within the scope of the present invention.

What is claimed is:

1. A foam sponge cutting machine with a vertical blade strap, comprising:

a machine body having a surface defining a working bench, said working bench being linearly reciprocally movable back and forth for moving a work piece placed thereon;

a blade strap rack having a substantially U-shaped cross section and bridging over said machine body, said blade strap rack having two upright columns, an upper transverse beam and a lower transverse beam connected between said two upright columns to define a blade strap winding space, each of the transverse beams including a guide rail and a transmission mechanism;

a blade rotating set including an upper and a lower blade seat, each blade seat including a seat body, a transmission mechanism and a blade clamping seat, a blade strap deflection rectifying mechanism disposed on one of said blade seats for automatically sensing and rectifying any deflection which exceeds a predetermined limit, said seat bodies being hung on the guide rails of the upper and lower transverse beams and coupled with the transmission mechanisms of the blade strap rack, whereby the blade seats can move along the guide rails, said blade strap deflection rectifying mechanism being coupled with the blade clamping seat which is disposed at the end of said blade seat for clamping said blade strap;

a guide wheel set including a driving wheel, two pulleys and several guide wheels, the pulleys being respectively disposed on the upper and lower blade seats, the guide wheels being disposed in the blade strap rack, the blade strap being pulled and conducted through the guide wheel set to define a closed loop with a fixed length; and a blade grinding mechanism including grinding wheels disposed on the blade strap rack, via a transmission mechanism, the grinding wheel being movable into contact with the blade strap.

2. A foam sponge cutting machine as claimed in claim 1, wherein the transmission mechanism of the upper and lower transverse beams of the blade strap rack includes a belt and wheel set connecting an output shaft of a motor with a transmission shaft, an upper and a lower ends of the transmission shaft being respectively perpendiculary coupled with two spiral rods which drive the upper and lower blade seats.

3. A foam sponge cutting machine as claimed in claim 1, wherein the guide wheel of the guide wheel set has a thickness less than the thickness of the blade strap rack.

4. A foam sponge cutting machine as claimed in claim 1, wherein the blade strap deflection rectifying mechanism includes a first positive gear combined with the blade clamping seat, the first positive gear meshing with a second and a third positive gears, the second positive gear being coupled with a spiral rod, the third positive gear coupled with an output shaft of a motor, the spiral rod being disposed with a slide block, several sensors being disposed within a moving range of the slide block.

5. A foam sponge cutting machine as claimed in claim 1, wherein the guide wheel set includes a first and a second guide wheels having nearly equal diameters, relatively small third guide wheel and a driving wheel, the upper rims of the first and second guide wheels being substantially tangential to each other, the first and second guide wheels both being positioned in the upper transverse beam, the driving wheel being positioned in the lower transverse beam, the third guide wheel being positioned beside the second guide wheel, the blade strap being wound over the driving wheel and then upward pulled to the first guide wheel and then tangentially pulled to the second guide wheel and then pulled to the third guide wheel and then pulled to the upper pulley and then downward pulled to the lower pulley and finally pulled back to the driving wheel to define a closed loop.

6. A foam sponge cutting machine as claimed in claim 1, wherein the blade sharpening mechanism includes left and right grinding wheels, and a belt and wherein each of said grinding wheels is connected with a motor by said belt and driven thereby, a locating member bridging the grinding wheels and pivotally connected therewith by pivot shafts, a rotary wheel being disposed at a rear end of a connecting plate of each grinding wheel, a linkage being disposed at a front end of a shaft of a pneumatic cylinder, two sides of the linkage being disposed with slope faces respectively pressing against the grinding wheels between the blade strap rack and the grinding wheels, a compression spring being disposed on a distance measuring rod connected with the grinding wheels, a tail end of the distance measuring rod being locked with an adjusting nut for controlling the gap between the grinding wheels and the blade strap, an extension spring being disposed between the blade strap rack and the grinding wheels.

* * * * *